US008688612B2

(12) United States Patent
Lee et al.

(10) Patent No.: US 8,688,612 B2
(45) Date of Patent: Apr. 1, 2014

(54) METHOD AND DEVICE FOR SAVING TRIPLE FOR VERIFYING REASON AND INCREMENTAL REASONING, AND METHOD AND DEVICE FOR REASON-DEPENDENT INDEXING APPROPRIATE FOR SAME

(75) Inventors: Seung Woo Lee, Daejeon (KR); Pyung Kim, Daejeon (KR); Han Min Jung, Daejeon (KR); Mi Kyoung Lee, Daejeon (KR); Dong Min Seo, Daejeon (KR); Won Kyung Sung, Daejeon (KR)

(73) Assignee: Korea Institute of Science & Technology Information, Daejeon (KR)

( * ) Notice: Subject to any disclaimer, the term of this patent is extended or adjusted under 35 U.S.C. 154(b) by 0 days.

(21) Appl. No.: 13/510,990

(22) PCT Filed: Nov. 4, 2010

(86) PCT No.: PCT/KR2010/007769
§ 371 (c)(1),
(2), (4) Date: May 21, 2012

(87) PCT Pub. No.: WO2012/060490
PCT Pub. Date: May 10, 2012

(65) Prior Publication Data
US 2013/0212057 A1    Aug. 15, 2013

(30) Foreign Application Priority Data
Nov. 2, 2010    (KR) .................. 10-2010-0108381

(51) Int. Cl.
*G06F 17/00* (2006.01)
*G06N 5/02* (2006.01)
*G06N 5/04* (2006.01)
*G06F 7/00* (2006.01)
*G06F 17/30* (2006.01)

(52) U.S. Cl.
CPC .................. *G06N 5/025* (2013.01); *G06N 5/02* (2013.01); *G06N 5/04* (2013.01); *G06F 17/30961* (2013.01); *G06F 17/30867* (2013.01)
USPC ............................................ 706/47; 707/797

(58) Field of Classification Search
CPC ........... G06N 5/025; G06N 5/02; G06N 5/04; G06F 17/30961; G06F 17/30867
USPC .......................................... 706/47; 707/797
See application file for complete search history.

(56) References Cited

U.S. PATENT DOCUMENTS

| | | | |
|---|---|---|---|
| 2006/0235823 A1* | 10/2006 | Chong et al. ....................... 707/1 |
| 2008/0288442 A1* | 11/2008 | Feigenbaum et al. ............. 707/2 |
| 2010/0030725 A1* | 2/2010 | Mendis et al. ..................... 707/1 |
| 2010/0036788 A1* | 2/2010 | Wu et al. .......................... 706/47 |
| 2010/0036862 A1* | 2/2010 | Das et al. ....................... 707/101 |
| 2011/0119310 A1* | 5/2011 | Kolovski et al. ............... 707/794 |

FOREIGN PATENT DOCUMENTS

| | | | |
|---|---|---|---|
| JP | 2008-176771 A | 7/2008 |
| KR | 10-2010-0040024 A | 4/2010 |
| KR | 10-2010-0068981 A | 6/2010 |
| KR | 10-2010-0068983 A | 6/2010 |

OTHER PUBLICATIONS

Das, Souripriya, et al. "A scalable scheme for bulk loading large RDF graphs into Oracle." Data Engineering, 2008. ICDE 2008. IEEE 24th International Conference on. IEEE, 2008.*
Das, Souripriya, and Jagannathan Srinivasan. "Database technologies for RDF." Reasoning Web. Semantic Technologies for Information Systems. Springer Berlin Heidelberg, 2009. 205-221.*
Erling, Orri, and Ivan Mikhailov. "RDF Support in the Virtuoso DBMS." Conference on Social Semantic Web. vol. 113. 2007.*
Lim, Lipyeow, Haixun Wang, and Min Wang. "Unifying data and domain knowledge using virtual views." Proceedings of the 33rd international conference on Very large data bases. VLDB Endowment, 2007.*
Shen, Wennan, and Yuzhong Qu. "An RDF storage and query framework with flexible inference strategy." Frontiers of WWW Research and Development-APWeb 2006. Springer Berlin Heidelberg, 2006. 166-175.*
Tan, Zheng-Hua. "Fuzzy metagraph and its combination with the indexing approach in rule-based systems." Knowledge and Data Engineering, IEEE Transactions on 18.6 (2006): 829-841.*

Wu, Zhe, et al. "Implementing an inference engine for RDFS/OWL constructs and user-defined rules in oracle." Data Engineering, 2008. ICDE 2008. IEEE 24th International Conference on. IEEE, 2008.*

Seung Woo Lee et al., "Efficient Reasoning Using View in DBMS-based Triple Store", The Korea Contents Annual Spring Conference, 2009.

Mai Saito et al., "A Cross-Search Mechanism on the P2P Overlay Network Using Faceted Search for RDF Data", The Second Forum on Data Engineering and Information Management, DEIM 2010, May 25, 2010.

Toby Segaran et al., "Programming the Semantic Web", Build Flexible Applications with Graph Data, O'Reilly Media, 1st edition, Jun. 24, 2010, Japan.

Akifumi Hasegawa et al., "Searching Java Software Structure by Inference of OWL 2.0", IPSJ SIG Technical Reports, vol. 2009, No. 31, pp. 137-144, Mar. 11, 2009, Japan.

Japanese Office Action for Japanese Patent Application No. 2012-541933.

* cited by examiner

*Primary Examiner* — Jeffrey A Gaffin
*Assistant Examiner* — James F Sugent

(74) *Attorney, Agent, or Firm* — LRK Patent Law Firm

(57) ABSTRACT

A method and apparatus for storing a triple and an inference dependency indexing apparatus appropriate to the method and system are provided. The method of storing a triple related to an inference method for creating other triples by applying an inference rule to the triple includes: (a) adding a serial number to each of triples and inference rules related to inference and storing the triples and the inference rules into a plurality of triple tables and inference rule tables; (b) indexing a triple inferred by applying the triple and the inference rule, using a serial number of the triple and a serial number of the inference rule related to inference; and (c) creating a triple view which allows accessing the triples physically distributed and stored in a plurality of triple storage units (tables) as if the triples are stored in a virtual storage unit (table).

3 Claims, 7 Drawing Sheets

FIG. 1

(a) Vertical design (b) Horizontal design (c) Mixed design

FIG. 4

(Backward Dependency Indexing)

| InferredTripleID | RuleID | TripleID1 | TripleID2 |
|---|---|---|---|
| 4 | 1 | 1 | 3 |
| 7 | 2 | 2 | 4 |
| 7 | 3 | 5 | 6 |

301

(Forward Dependency Indexing)

| TripleID | InferredTripleID |
|---|---|
| 1 | 4 |
| 2 | 7 |
| 3 | 4 |
| 4 | 7 |
| 5 | 7 |
| 6 | 7 |

303

METHOD AND DEVICE FOR SAVING TRIPLE FOR VERIFYING REASON AND INCREMENTAL REASONING, AND METHOD AND DEVICE FOR REASON-DEPENDENT INDEXING APPROPRIATE FOR SAME

TECHNICAL FIELD

The present invention relates to a method of storing a triple according to inference, and more specifically, to a method of storing a triple and an apparatus thereof, and an apparatus for indexing dependency of inference and a method of verifying dependency of inference appropriate thereto, in which a basis for a service provided through the inference is presented, and incremental reasoning is supported even when a triple is deleted.

BACKGROUND ART

In a semantic web, knowledge is expressed as ontology such as a Resource Description Framework (RDF) or a Web Ontology Language (OWL), and reasoning performs a function for expanding and processing the knowledge expressed as ontology. The ontology is a set of RDF triples, and each triple is configured as a set of <subject, predicate, object>. The triple is also referred to as a fact.

Depending on a time point of performing reasoning, reasoning techniques can be classified into forward reasoning which performs all steps of reasoning in advance before a query enters and backward reasoning which performs only the reasoning needed to process a query at a moment when the query enters. As the scale of ontology increases, a trend in recent reasoning techniques is a method of adopting the forward reasoning appropriate for instant query and answering as a mainstream and partially mixing the backward reasoning thereto. In addition, the reasoning techniques can be classified into descriptive logic-based reasoning and rule-based reasoning depending on a base logic, and the rule-based reasoning is advantageous from the practical aspect of reasoning, and the descriptive logic-based reasoning is advantageous from the completeness aspect of reasoning.

Although the rule-based forward reasoning technique is advantageous from the practical aspect of reasoning aiming at large-scaled ontology, if some triples of the ontology are changed or deleted, also triples that have already inferred and expanded from the changed or deleted triples are not valid any more. Therefore, it is general that the entire reasoning is performed again in order to solve this problem, and since a plenty of time is required for performing the reasoning, this can be an obstacle from the aspect of practicality.

Meanwhile, although a semantic web-based reasoning service analyzes and presents a result (e.g., research experts or a researcher network in a specific field) inferred from the knowledge explicitly expressed in the ontology through an internal process by applying the ontology and reasoning techniques, it does not provide a basis explaining how the analysis result is obtained. Unlike general information retrieval capable of instantly determining whether or not a result of retrieval is appropriate on viewing the retrieval result, the reasoning service cannot immediately determine whether or not a result of the service is correct only by viewing the service result.

Accordingly, users become doubtful about reliability of the semantic web-based reasoning service, and this may decrease satisfaction of users using the service.

Therefore, required is a triple storage technique capable of performing incremental reasoning without the need of performing the entire reasoning process even when a triple is deleted and presenting a basis (inference verification) for a result of the reasoning when a user requests.

Methods of physically storing an explicit triple and an inferred triple can be roughly categorized into three types as shown in FIG. 1. A vertical design method stores all triples in one storage unit (e.g., a DBMS table), and since the method is easy to design, it is advantageous when the scale of a triple is small. However, since concentrativeness of triples on a storage unit increases as the scale increases, efficiency is decreased. Contrarily, a horizontal design method distributes and stores triples by the property and the class, and if the scale of the triple is large, the method has advantages corresponding to a distribution effect. A mixed design is a method between the vertical design and the horizontal design. However, since incremental reasoning and inference verification cannot be effectively supported only with the mixed design, a separate storage technique is required.

DISCLOSURE OF INVENTION

Technical Problem

Therefore, the present invention has been made in view of the above problems, and it is an object of the present invention to provide a method of storing a triple based on a semantic web in order to support incremental reasoning based on a semantic web technique and a basis explanation about a reasoning service (i.e., inference verification).

Another object of the present invention is to provide an apparatus for indexing inference dependency appropriate to the method described above.

Still another object of the present invention is to provide an apparatus for storing a triple appropriate to the method described above.

Still another object of the present invention is to provide a method of verifying inference dependency using the apparatus for storing a triple.

Technical Solution

In the present invention, a serial number is added to each of triples and inference rules related to inference before storing the triple and the inference rule. A dependency relation of a triple inferred by applying the triples and inference rules is indexed and stored using the serial numbers of the triples and inference rules applied to the inferred triple, and thus reliability of inference is enhanced by presenting the dependency relation as a basis for the inference when a user requests.

When a certain fact is deleted, inferred facts dependent on the deleted fact are traced and deleted, and thus efficiency of incremental reasoning can be enhanced.

To accomplish the above objects, according to one aspect of the present invention, there is provided a method of storing a triple related to an inference method for creating other triples by applying an inference rule to the triple, the method including the steps of: (a) adding a serial number to each of triples and inference rules related to inference and storing the triples and the inference rules into a plurality of triple tables and inference rule tables; (b) indexing a triple inferred by applying the triple and the inference rule, using a serial number of the triple and a serial number of the inference rule related to inference; and (c) creating a triple view which allows accessing the triples physically distributed and stored in a plurality of triple storage units (tables) as if the triples are stored in a virtual storage unit (table).

Here, the indexing step creates a backward dependency indexing table having a serial number of the inferred triple as an index key and the serial number of the triple and the serial number of the inference rule used for inference as contents; and a forward dependency indexing table having the serial number of the triple used for inference as an index key and the serial number of the inferred triple as contents.

The method of storing a triple preferably further includes the step of (d) performing incremental reasoning using the index and the triple view when a triple is deleted.

Here, the step of (d) performing incremental reasoning when a triple is deleted includes the steps of: deleting a triple requested to be deleted from a triple table; searching for index contents having a serial number of the triple requested to be deleted from the forward dependent indexing table, obtaining serial numbers of triples inferred depending on the triple requested to be deleted, and deleting searched index contents from the forward dependent indexing table; searching for index contents having serial numbers of triples inferred depending on the triple requested to be deleted from the backward dependency indexing table, and deleting index contents containing the serial number of the deleted triple among searched index contents from the backward dependency indexing table; and deleting the triples inferred depending on the triple requested to be deleted from the triple table, if there is no index contents that do not contain the serial number of the deleted triple among the searched index contents.

According to another aspect of the present invention, there is provided an inference dependency indexing apparatus comprising: a triple and rule serial number assignment unit for adding a serial number to each of triples and inference rules and storing the triples and the inference rules into a plurality of triple tables and inference rule tables; an inference execution unit for inducing new triples by applying the inference rule to explicitly existing triples; an inference dependency indexing unit for indexing and storing a dependency relation between the triples and inference rule used for inference and the triples newly inferred through the inference in order to support inference verification and incremental reasoning; and a triple view creation unit which allows accessing the triples physically distributed and stored in the plurality of triple tables as if the triples are virtually stored in a storage unit.

Here, the inference dependency indexing unit creates a backward dependency indexing table having a serial number of the inferred triple as an index key and the serial number of the triple and the serial number of the inference rule used for inference as contents; and a forward dependency indexing table having the serial number of the triple used for inference as an index key and the serial number of the inferred triple as contents.

In addition, in response to a triple deletion request, the inference dependency indexing unit deletes a triple requested to be deleted from a triple table; searches for index contents having a serial number of the triple requested to be deleted from the forward dependent indexing table, obtains serial numbers of triples inferred depending on the triple requested to be deleted, and deletes searched index contents from the forward dependent indexing table; searches for index contents having serial numbers of triples inferred depending on the triple requested to be deleted from the backward dependency indexing table, and deletes index contents containing the serial number of the deleted triple among searched index contents from backward dependency indexing table; and deletes the triples inferred depending on the triple requested to be deleted from the triple table, if there is no index contents that do not contain the serial number of the deleted triple among the searched index contents.

According to still another aspect of the present invention, there is provided a triple storage apparatus related to an inference apparatus for creating other triples by applying an inference rule to a triple, the triple storage apparatus comprising: a plurality of triple tables for storing triples added with a serial number; an inference rule table for storing inference rules added with a serial number; a forward dependency indexing table and a backward dependency indexing table for storing a result of indexing another triple inferred by applying a triple and an inference rule using serial numbers of the triple and the inference rule applied to the inferred triple, and a triple view which allows accessing the triples physically distributed and stored in the plurality of triple tables as if the plurality of triple tables is a virtual storage unit (table).

According to still another aspect of the present invention, there is provided a method of providing inference verification of a triple inferred from a triple storage apparatus comprising: a plurality of triple tables for storing triples added with a serial number, an inference rule table for storing inference rules added with a serial number, an inference dependency indexing table for storing a result of indexing another triple inferred by applying a triple and an inference rule using serial numbers of the triple and the inference rule applied to the inferred triple, and a triple view which allows accessing the triples physically distributed and stored in the plurality of triple tables as if the plurality of triple tables is a virtual storage unit (table), the method comprising the steps of: obtaining a serial number of the inferred triple for which the inference verification is requested; obtaining serial numbers of an inference rule and triples in a dependency relation by searching for the serial number of the inferred triple from the inference dependency indexing table; obtaining information on an inference rule corresponding to the serial number of the inference rule from the inference rule table, and obtaining information on triples corresponding to the serial numbers of the triples from the triple view; and presenting the obtained information on the inference rule and the triples as a basis of the inference.

Here, the inference dependency verification method further includes the steps of: in response to a request for deleting a triple recorded in the triple table, deleting the triple requested to be deleted from the triple table; deleting index contents related to a serial number of the triple requested to be deleted from the inference dependency indexing table; and deleting triples inferred only by the triple requested to be deleted from the triple table.

Advantageous Effects

Since the method of storing a triple of the present invention indexes, and stores a dependency relation of an inferred fact using serial numbers of a fact and an inference rule applied to the inferred fact and presents the dependency relation as a basis for the inference when a user requests, reliability of inference is enhanced. In addition, when a certain fact is deleted, inferred facts dependent on the deleted fact are traced and deleted, and thus efficiency of incremental reasoning may be enhanced.

BRIEF DESCRIPTION OF THE DRAWINGS

FIG. 1 a view showing an example of a triple repository.

FIG. 4 is a view showing a result of executing an inference dependency indexing unit of FIG. 2.

DESCRIPTION OF SYMBOLS

100: Triple and rule serial number assignment unit
200: Inference execution unit
300: Inference dependency indexing unit
400: Triple view creation unit

BEST MODE FOR CARRYING OUT THE INVENTION

The preferred embodiments of the present invention will be hereafter described in detail, with reference to the accompanying drawings.

Figure 1:
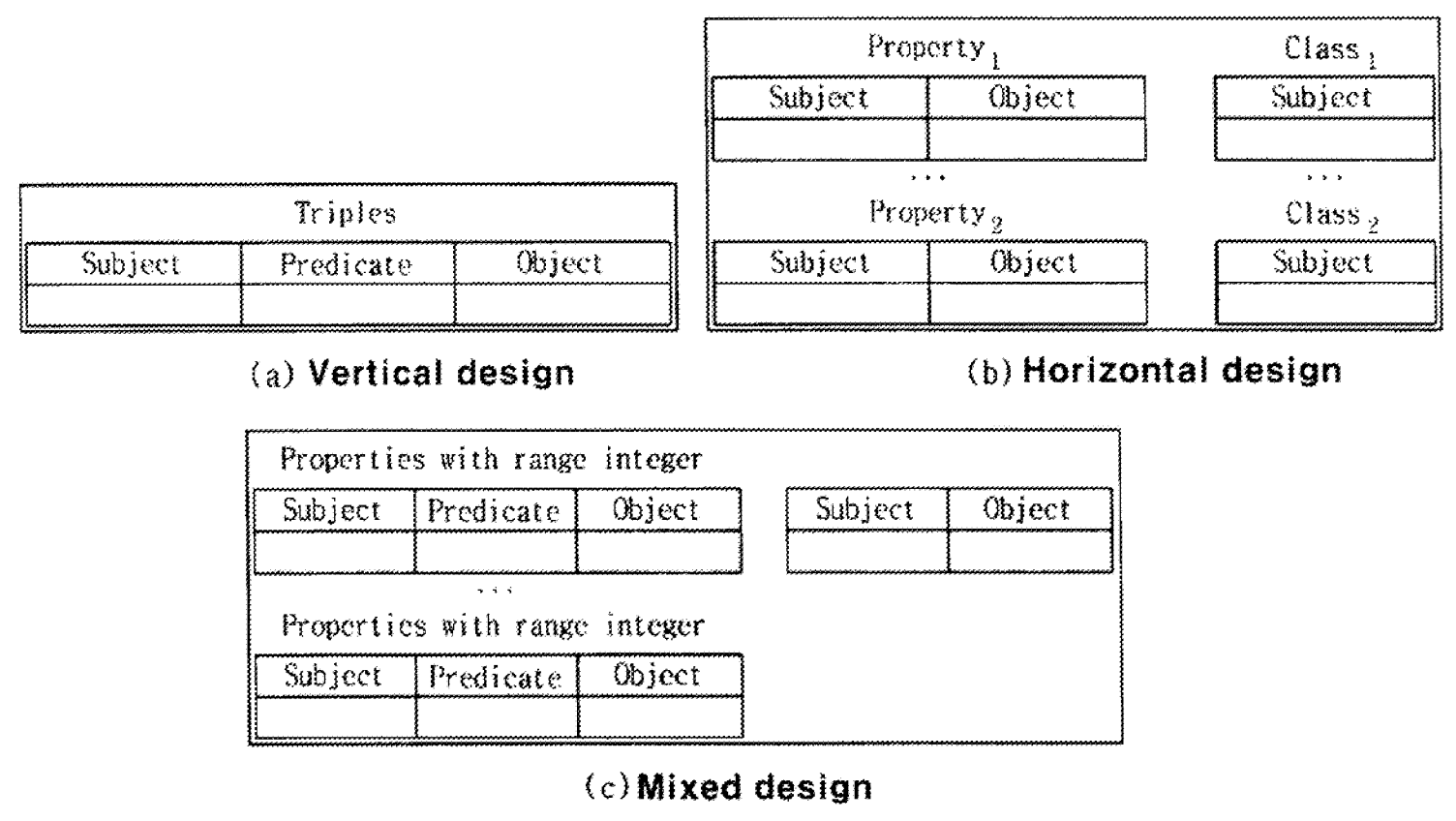

Generally, a triple (a fact) is stored in one of the three forms shown in FIG. 1. Particularly, a horizontal design method or a mixed design method of FIG. 1 is mainly used in order to support practical reasoning aiming at ontology of a large scale, and in addition, triples inferred by forward reasoning, as well as triples explicitly existing in the ontology, are stored in a triple repository considering practicality. However, inference verification and incremental reasoning cannot be supported with only such a storage structure.

Reasoning is a process of obtaining a new (inferred) [triple] by applying a [inference rule] to an existing [triple]. The present invention relates to the triple repository for supporting inference verification and incremental reasoning, and a dependency relation between an inferred [triple] obtained from reasoning and an existing [triple] and an [inference rule] used for the reasoning is indexed and stored.

Figure 2:
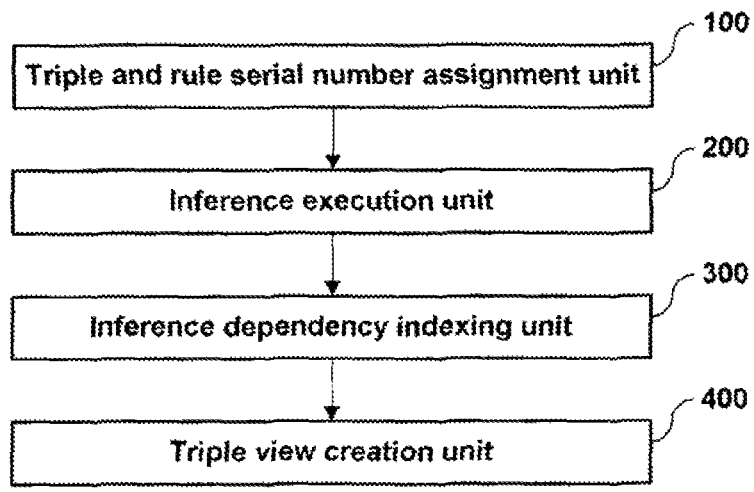
FIG. 2 is a block diagram showing an inference dependency indexing apparatus according to the present invention.

FIG. 2 is a view showing the configuration of an inference dependency indexing apparatus according to the present invention. The inference dependency indexing apparatus includes a triple and rule serial number assignment unit 100, an inference execution unit 200, an inference dependency indexing unit 300 and a triple view creation unit 400.

Figure 3:
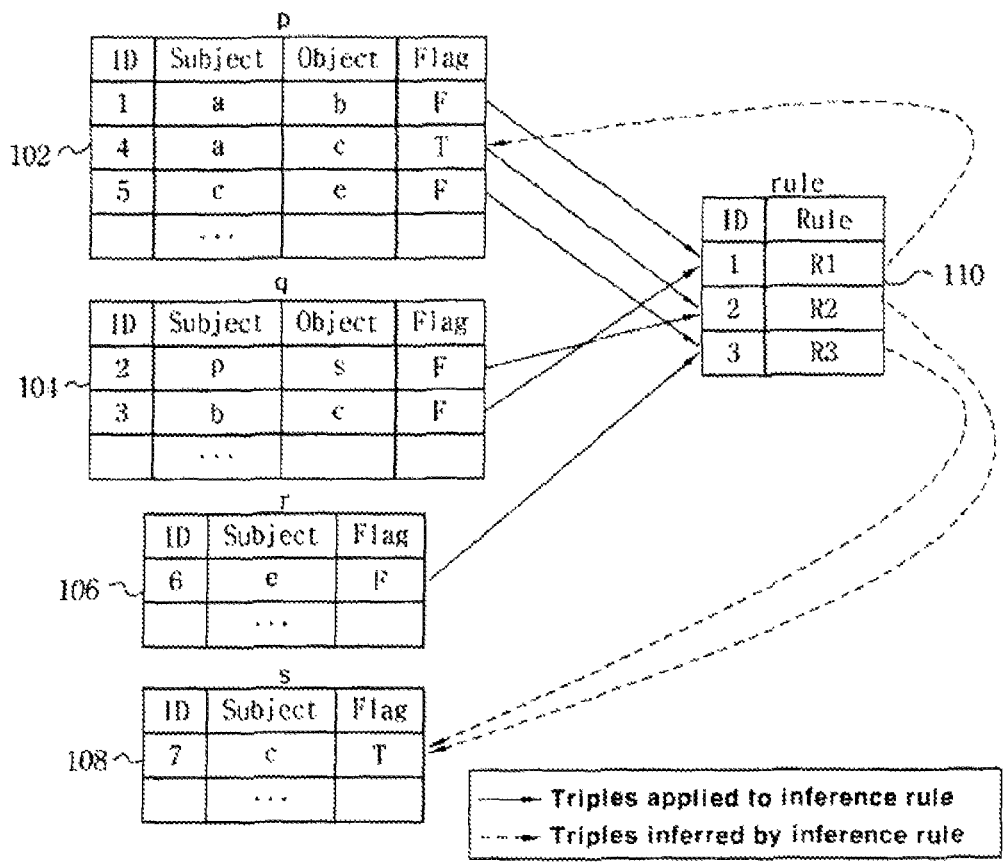
FIG. 3 is a view showing a result of executing a triple and rule serial number assignment unit of FIG. 2.

The triple and rule serial number assignment unit 100 assigns a serial number to each triple and reasoning rule and stores the triple and the inference rule. In the triple storage structure of the horizontal design method or mixed design method shown in FIG. 1, triples are distributed and stored by the type, and the serial number should be assigned as a serial number within the entire triples, not a serial number within each storage unit (table). That is, FIG. 3 shows, for example, that a serial number is assigned to each ID column of the four triple tables (p 102, q 104, r 106 and s 108) within the entire triples. In addition, the inference rule table (rule 109→110) of FIG. 3 shows, for example, that a serial number is also assigned to each inference rule within the inference rules. The Flag column of each triple table indicates whether or not the corresponding triple is a triple obtained through inference, and if the triple is obtained through inference, the Flag column is indicated as T (true), otherwise the Flag column is indicated as F (false).

The inference execution unit 200 induces new triples by applying an inference rule to explicitly existing triples. The inferred triples can also be recursively applied to the inference rule.

In FIG. 3, it is understood that the relationships shown below are established.

[Triple4]<==[Triple1]+[Triple3]+[Rule1]

[Triple7]<==[Triple2]+[Triple4]+[Rule2]

[Triple7]<==[Triple5]+[Triple6]+[Rule3]

Here, the left side of the arrow (<==) is an inferred triple (a result of inference), and the right side indicates triples and an inference rule, which are basis information for the result of inference. The solid arrows of FIG. 3 point triples applied to (inputted into) each inference rule, and dotted arrows point new triples, i.e., inferred triples, obtained as a result of applying the inference rules.

As is understood from FIG. 3, an inferred triple (e.g., [triple4]) can be used for another inference (e.g., applied to [rule2]). In addition, one triple can be applied to several inference rules, and the same inferred triple can be obtained through different inference rules (e.g., [triple7] can be obtained through [rule2] and [rule3].)

[Triple] is also referred to as a fact in other words and is configured as <subject, predicate, object>. [Inference rule] is configured as [consequent part]<==[antecedent part]. The [antecedent part] is configured of one or more [triple pattern]'s, and the [consequent part] is configured of one [triple pattern]. Although the [triple pattern] is configured as <subject, predicate, object> like a triple, the subject, the predicate and the object may be a variable respectively, not a constant. Here, the [inference rule] means that when facts can be applied to the triple patterns of the [antecedent part], a triple corresponding to the [consequent part] can be induced (inferred) as a new fact.

The inference dependency indexing unit 300 indexes and stores a dependency relation between the triples and inference rule used for inference and triples newly inferred through the inference, in order to support inference verification and incremental reasoning.

FIG. 4 is a view showing an example of an inference dependency indexing table created using the triples and inference rules of the FIG. 3. The inference dependency indexing table is divided into two types. First, for inference verification, a backward dependency indexing table 301 is created so as to easily search for base triples and inference rules that have induced the inferred result triple.

That is, a dependency relation is indexed and stored by setting an ID of an inferred triple InferredTripleID as an index key and setting an ID of an inference rule RuleID and IDs of respective triples TripleID1, TripleID2, . . . , TripleIDn as contents. In other words, the dependency relation is stored in a structure capable of instantly obtaining a rule number and triple numbers used for the inference for the serial number of each inferred triple. This is similar to a structure of indexing a document number of a document containing a search word for each search word so as to promptly search for a document containing the search word in a general information retrieval.

Next, for incremental reasoning at the time of triple deletion, a forward dependency indexing table 303 is created so as to easily search for triples inferred from the deleted triple. That is, a dependency relation is indexed and stored by setting an ID of a triple TripleID used for inference as an index key and setting an ID of a triple InferredTripleID created by the inference as contents.

Describing using the triples and inference rules of FIG. 3 as an example, the fact that [triple4] is inferred by applying [triple1] and [triple3] to [rule1] is expressed in the first row of the backward dependency indexing table 301 and, in addition, it is also expressed in the first and third rows of the forward dependency indexing table 303.

Although the backward dependency indexing table 301 is expressed in two columns of TripleID1 and TripleID2 assuming that only two or less triples used for one inference rule, the backward dependency indexing table 301 can be expanded such as TripleID1, TripleID2, . . . , TripleIDn when triples less than n can be applied.

The triple view creation unit 400 creates a view of the entire triples (e.g., a DBMS view) so as to access triples physically distributed and stored in a plurality of storage units (tables) as if the triples are virtually stored in one storage unit.

If a triple ID is given when triples are distributed and stored in a plurality of storage units (tables) like in the case of the horizontal design and the mixed design of FIG. 1, a storage unit (table) storing the triple ID should be known in order to figure out actual contents (<subject, predicate, object>) of the triple. However, if a triple view is used, the triple can be accessed regardless of the storage unit (table).

Figure 5:
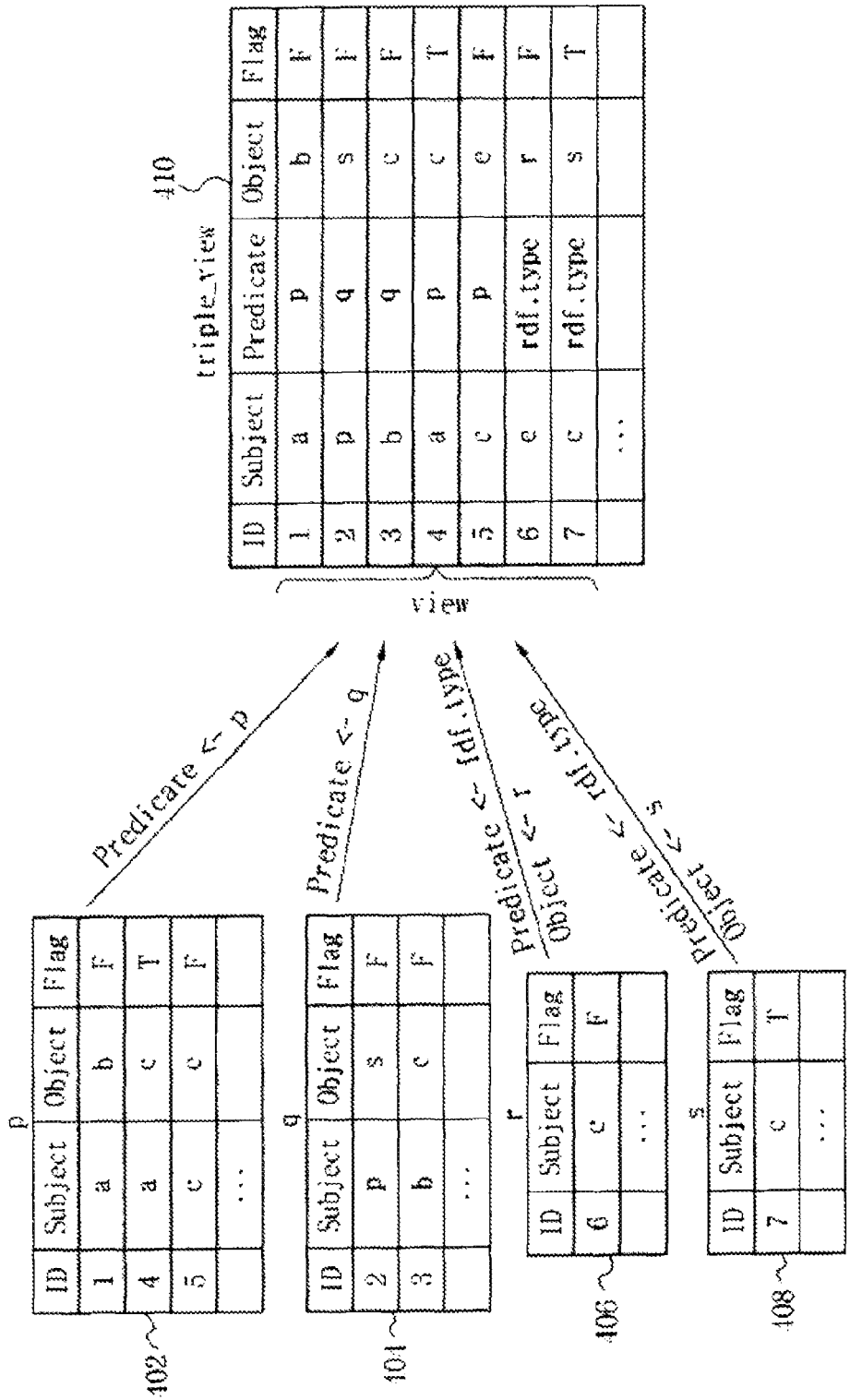
FIG. 5 is a view showing a result of executing a triple view creation unit of FIG. 2.

FIG. 5 is a view showing a result of executing a triple view creation unit of FIG. 2. That is, the triple_view 410 is a triple view (e.g., a DBMS view), which is a virtual storage unit (table) allowing four triple storage units (tables) of p table 402, q table 404, r table 406 and s table 408 to be accessed as if they are one physical storage unit (table). The triple view has all of the subject column, the predicate column and the object column so as to access all the triples.

Since the name of the triple storage unit (table) corresponds to a predicate, the value of the Predicate column is set to p which is the name of the storage unit (table) when the p table 402 is accessed through the triple view. In the same manner, when the q table 404 is accessed through the triple view, the value of the Predicate column is set to q which is the name of the storage unit (table). The r table 406 and the s table 408 are for storing instances of each class, and since the name of the storage unit (table) is a class name corresponding to an object, and the predicate is rdf:type, the value of the Predicate column is set to rdf:type when the r table 406 is accessed through the triple view, and the value of the Object column is set to r which is the name of the storage unit (table). The value of the Predicate column is set to rdf:type when the s table 408 is accessed through the triple view, and the value of the Object column is set to s which is the name of the storage unit (table).

The inference verification is providing a basis for the inferred [triple(fact)], and incremental reasoning at the time of deleting a triple means recursively tracing and deleting triples inferred by the deleted triple. The present invention proposes a method of indexing a dependency relation between an inferred [triple] and a [triple] and an [inference rule] used for inference for inference verification and incremental reasoning at the time of deletion.

Figure 6:
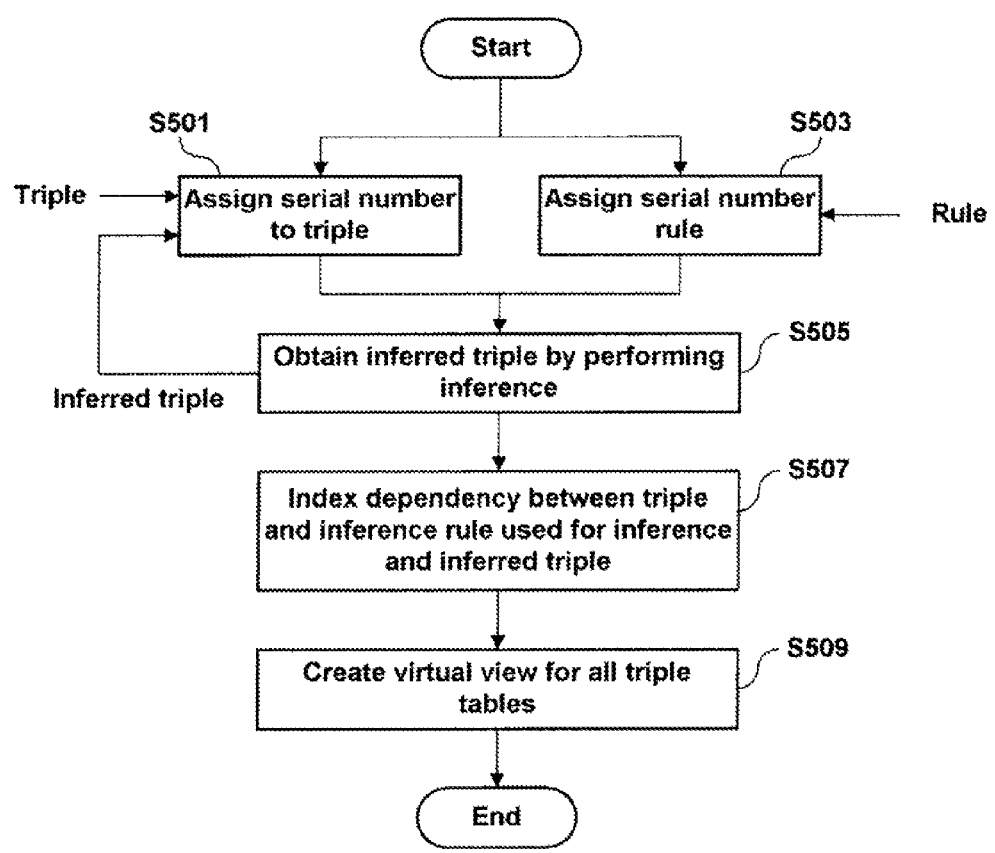
FIG. 6 is a flowchart illustrating a method of storing a triple according to the present invention.

FIG. 6 is a flowchart illustrating a method of storing a triple according to the present invention. Referring to FIG. 6, for inference dependency indexing, first, a unique serial number ID is assigned to each of entire triples S501, and a unique serial number ID is also assigned to each of inference rules S503. Even when the triples are distributed and stored by the type, a serial number is uniquely assigned within the entire triples.

Next, an inference procedure for inferring a new triple is performed by applying inference rules to triples S505. A triple serial number ID is also assigned to the inferred triples obtained here.

Next, a dependency relation between the triples and inference rules used for the inference and the triple obtained through the inference is indexed S507. The index procedure is divided into two types, and one is backward dependency indexing in which a serial number of an inferred triple InferredTripleID is set as an index key and a serial number of an inference rule RuleID and serial numbers of triples TripleID1, TripleID2, . . . , TripleIDn used for inference are set as contents, and the other is forward dependency indexing in which a serial number of a triple TripleID used for inference is set as an index key and a serial number of an inferred triple InferredTripleID is set as contents.

Finally, if the triples are distributed and stored in a plurality of storage units (tables) by the type, a virtual triple view (e.g., a DBMS view) allowing the entire triples to be accessed regardless of the storage unit (table) is created S509.

Figure 7:
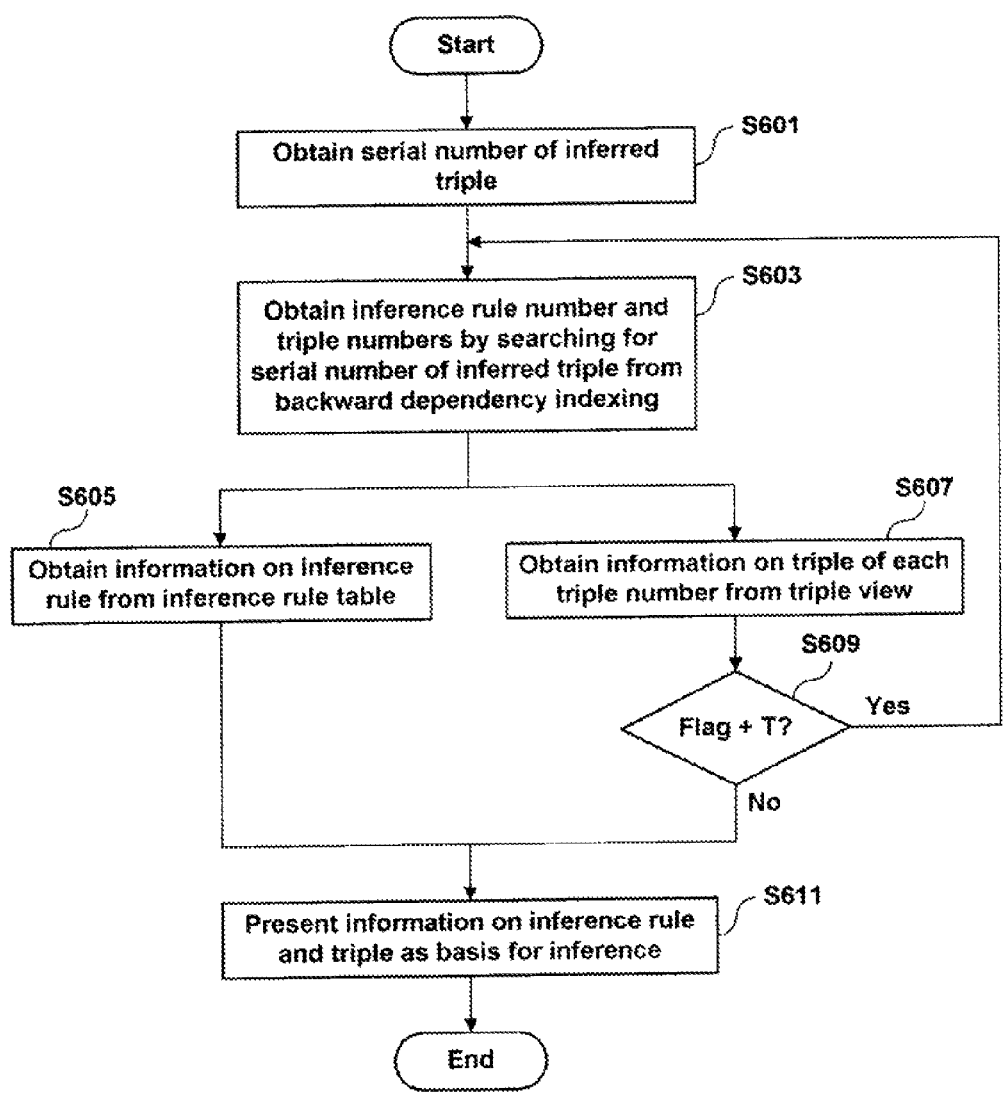
FIG. 7 is a flowchart illustrating a method of performing inference verification in an inference dependency indexing apparatus according to the present invention.
Figure 8:
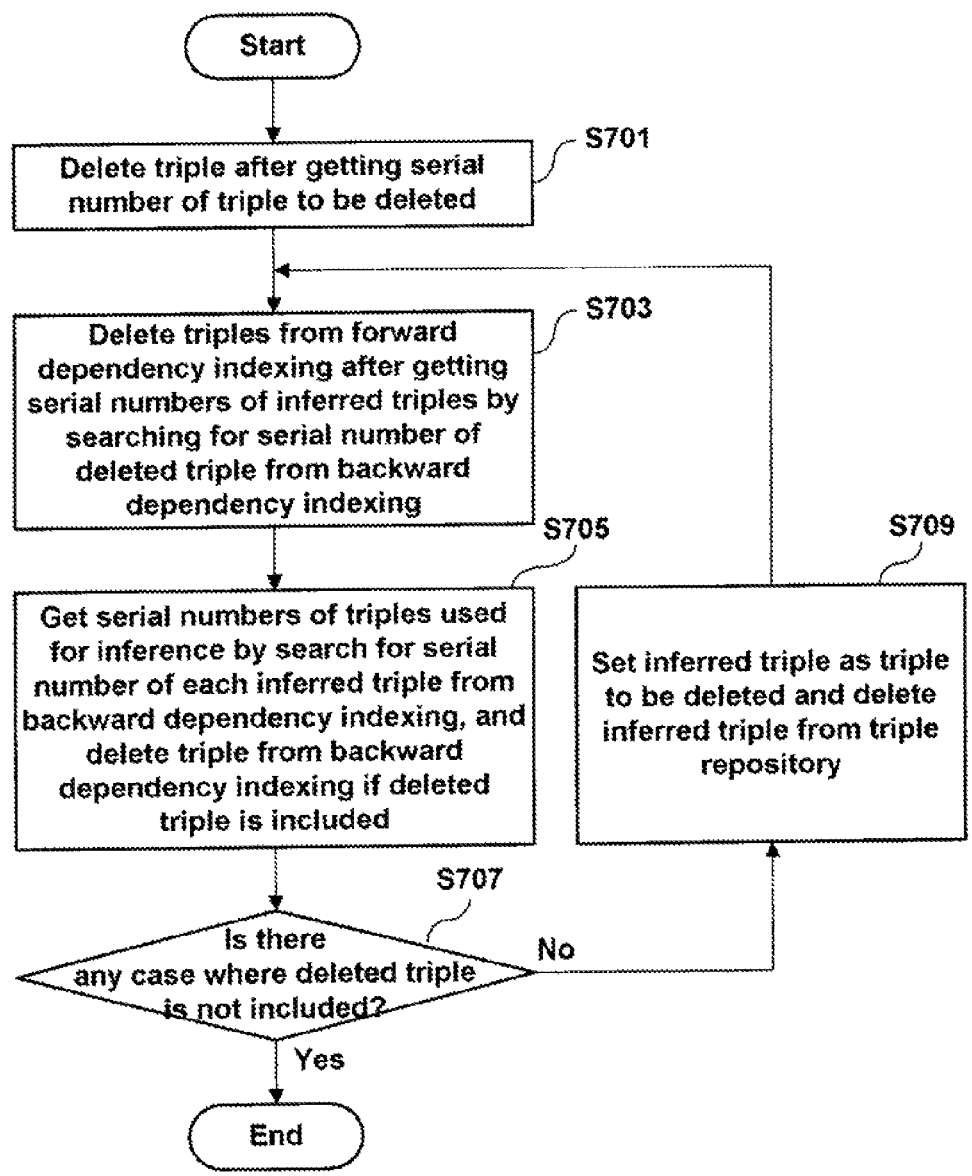
FIG. 8 is a flowchart illustrating a method of performing incremental reasoning when a triple is deleted in an inference dependency indexing apparatus according to the present invention.

A method of performing inference verification and incremental reasoning at the time of triple deletion using the backward dependency indexing, the forward dependency indexing, and the triple view is shown in FIGS. 7 and 8, respectively.

Referring to FIG. 7, if an inferred triple requiring inference verification is given, the user first acquires a serial number of this triple S601. Next, an inference rule number and triple numbers in a dependency relation are obtained by searching for the serial number in the backward dependency indexing table S603.

Next, information on the inference rule is obtained from the inference rule table S605, and information on a triple (subject, predicate, object, and Flag) is obtained for each triple number from the triple_view S607. At this point, if the value of the Flag is T (true) for each piece of triple information S609, the triple is also inferred by another inference rule and other triples, and thus the flow returns to the step of searching the backward dependency indexing table S603. If the value of the Flag is not T (true), the information on the inference rule and the triple obtained as described above is presented to the user as a basis for the inference.

Describing with reference to FIG. 4 for example, [rule2], [triple2] and [triple4] can be presented as an inference basis of [triple7], and since [triple4] is also an inferred fact, an inference basis for this should also be presented. For perfect inference verification, pure facts and inference rules applied to the pure facts should be presented as a basis, and the pure facts and the inference rules can be obtained by recursively searching for inference dependency if the backward dependency indexing table 301 of FIG. 4 is used. That is, the basis information for [triple7] is [rule2]+[triple2] ([rule1]+[triple1]+[triple3]).

An inferred [triple] can be obtained from two or more sets of (triples+inference rule). Describing with reference to FIG. 4 for example, [triple7] is an inferred triple number and is shown twice (in the second and third rows) in the backward dependency indexing table 301.

As described above, one inferred triple number can be indexed in the backward dependency indexing table 301 two or more times, and multiple search results can be obtained when searching the backward dependency indexing table 301 S603 for inference verification. That is, [rule3]+[triple5]+[triple6] is presented as basis information, together with [rule2]+[triple2]+([rule1]+[triple1]+[triple3]) described above.

A method of performing incremental reasoning when a triple is deleted is described with reference to FIG. 8. If a triple to be deleted is given, a serial number of the triple is obtained first, and the triple is deleted from the triple repository S701.

Next, after obtaining serial numbers of all triples inferred depending on the deleted triple by searching for the serial number in the forward dependence indexing table, the triples are deleted from the forward dependence indexing table S703. Serial numbers of triples where the inferred triples depend on is obtained by searching for the serial numbers of the inferred triples from the backward dependency indexing table this time, and the search results containing the serial number of the deleted triple are deleted from the backward dependency indexing table S705.

If there is no search result that is not deleted (i.e., a triple inferred without being dependent on the deleted triple) S707, the inferred triple can be inferred only by the deleted triple and is not valid any more due to the deletion of the triple. Therefore, the inferred triple is also set as a triple to be deleted, and a triple corresponding to the serial number of the inferred triple is deleted from the triple repository through the triple_view S709, and the flow returns to the step of searching the forward dependency indexing table S703.

If an undeleted triple exists in the search result S707, the inferred triple may be inferred by another triple, and thus the inferred triple is still valid and is not deleted.

This will be described below with reference to FIGS. 3 and 4.

First, a case of deleting a triple having serial number "1" will be described. In response to a request for deleting a triple having serial number "1", the first row is deleted from the p table 102 first.

Next, the forward dependency indexing table is searched using the serial number "1" as a key, and searched index contents (a row, here) are deleted. As a result, the first row is deleted from the forward dependency indexing table shown in FIG. 4. At this point, serial number "4" of a triple inferred depending on the triple requested to be deleted is obtained.

Next, the backward dependency indexing table is searched using serial number "4" of the inferred triple as a key, and index contents having the triple requested to be deleted are deleted among the search result. As a result, the first row is deleted from the backward dependency indexing table shown in FIG. 4.

Meanwhile, if there is no other row that does not contain triple "1" requested to be deleted in the backward dependency indexing table, the inferred triple "4" is inferred only by triple "1" requested to be deleted. Therefore, if triple "1" requested to be deleted is deleted, triple "4" inferred only by triple "1" is also deleted automatically.

Next, a case of deleting a triple having serial number "2" will be described. In response to a request for deleting a triple having serial number "2", the first row is deleted from the q table 104 first.

Next, the forward dependency indexing table is searched using the serial number "2" of the triple requested to be deleted as a key, and searched index contents are deleted. As a result, the second row is deleted from the forward dependency indexing table shown in FIG. 4. At this point, serial number "7" of a triple inferred depending on triple "2" requested to be deleted is obtained.

Next, the backward dependency indexing table is searched using serial number "7" of the inferred triple as a key, and index contents having triple "2" requested to be deleted are deleted among the search result. As a result, the second row is deleted from the backward dependency indexing table shown in FIG. 4.

Meanwhile, since there are other index contents (the third row) that do not contain triple "2" requested to be deleted in the backward dependency indexing table, it is possible that triple is inferred from triples other than triple "2" requested to be deleted. Therefore, although triple "2" requested to be deleted is deleted, triple "7" inferred from triple "2" should not be deleted.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

INDUSTRIAL APPLICABILITY

Since the present invention indexes and stores a dependency relation using serial numbers of a fact and an inference rule applied to an inferred fact and presents the dependency relation as a basis for inference when a user requests, the present invention may enhance reliability of inference.

The invention claimed is:

1. A triple storage method related to an inference method for creating other triples by applying an inference rule to an existing triple, the method comprising the steps of:
   (a) adding a triple serial number to each triple and an inference rule serial number to each inference rule related to inference and storing the triples and the inference rules into a plurality of triple tables and inference rule tables, wherein the triple serial number and the inference rule serial number are added independently;
   (b) indexing an inferred triple having an inferred triple serial number by applying the triple and the inference rule, using the triple serial number and the inference rule serial number related to inference, wherein the indexing step creates a backward dependency indexing table having the inferred triple serial number as an index key and the triple serial number and the inference rule serial number used for inference as contents, and a forward dependency indexing table having the triple serial number used for inference as an index key and the inferred triple serial number as contents;
   (c) creating a triple view which allows accessing the triples physically distributed and stored in a plurality of triple storage units (tables) as if the triples are stored in a virtual storage unit (table); and
   (d) performing incremental reasoning using the index and the triple view when one of the triples is deleted,
   wherein the step of (d) performing incremental reasoning when one of the triples is deleted includes the steps of:
      deleting one of the triples requested to be deleted from a triple table;
      searching for index contents having the triple serial number of the triple requested to be deleted from the forward dependent indexing table, obtaining inferred triple serial numbers depending on the triple requested to be deleted, and deleting searched index contents from the forward dependent indexing table;
      searching for index contents having inferred triple serial numbers depending on the triple requested to be deleted from the backward dependency indexing table, and deleting index contents containing the triple serial number of the deleted triple among searched index contents from the backward dependency indexing table; and
      deleting the inferred triples depending on the triple requested to be deleted from the triple table, if there is no index contents that do not contain the triple serial number of the deleted triple among the searched index contents.

2. An inference dependency indexing apparatus which is executed by at least one computer processor, comprising:
   a triple and rule serial number assignment unit configured to add a triple serial number to each triple and an inference rule serial number to each inference rule and store the triples and the inference rules into a plurality of triple tables and inference rule tables, wherein the triple serial number and the inference rule serial number are added independently;
   an inference execution unit configured to infer new triples by applying the inference rule to explicitly existing triples;
   an inference dependency indexing unit configured to index and store a dependency relation between the triples and inference rule used for inference and the newly inferred triples through the inference in order to support inference verification and incremental reasoning, and create a backward dependency indexing table having an inferred triple serial number of each of the inferred triples as an index key and the triple serial number and the inference rule serial number used for inference as contents, and a forward dependency indexing table having the triple serial number used for inference as an index key and the inferred triple serial number of each of the inferred triples as contents; and
   a triple view creation unit configured to allow accessing the triples physically distributed and stored in the plurality of triple tables as if the triples are virtually stored in a storage unit,
   wherein in response to a triple deletion request, the inference dependency indexing unit
      deletes a triple requested to be deleted from a triple table;
      searches for index contents having the triple serial number of the triple requested to be deleted from the forward dependent indexing table, obtains inferred triple serial numbers of inferred triples depending on the triple requested to be deleted, and deletes searched index contents from the forward dependent indexing table;
      searches for index contents having inferred triple serial numbers of inferred triples depending on the triple requested to be deleted from the backward dependency indexing table, and deletes index contents containing the triple serial number of the deleted triple among searched index contents from backward dependency indexing table; and
      deletes the inferred triples depending on the triple requested to be deleted from the triple table, if there is no index contents that do not contain the triple serial number of the deleted triple among the searched index contents.

3. A method of providing inference verification of an inferred triple from a triple storage apparatus comprising: a plurality of triple tables for storing triples added with a triple serial number, an inference rule table for storing inference rules added with an inference rule serial number, an inference dependency indexing table for storing a result of indexing another inferred triple by applying an existing triple and an inference rule using the triple serial number and the inference rule serial number applied to the inferred triple, and a triple view which allows accessing the triples physically distributed and stored in the plurality of triple tables as if the plurality of triple tables is a virtual storage unit (table), wherein the triple serial number and the inference rule serial number are added independently, the method comprising the steps of:
   obtaining an inferred triple serial number of the inferred triple for which the inference verification is requested;
   obtaining the inference rule serial number and the triple serial number in a dependency relation by searching for the inferred triple serial number of the inferred triple from the inference dependency indexing table;
   obtaining information on an inference rule corresponding to the inference rule serial number from the inference rule table, and obtaining information on triples corresponding to the triple serial numbers of the triples from the triple view;
   presenting the obtained information on the inference rule and the triples as a basis of the inference;
   deleting the triple requested to be deleted from the triple table in response to a request for deleting a triple recorded in the triple table;
   deleting index contents related to the triple serial number of the triple requested to be deleted from the inference dependency indexing table; and
   deleting inferred triples only by the triple requested to be deleted from the triple table.

* * * * *